(12) United States Patent
Quaglino, Jr.

(10) Patent No.: US 6,460,505 B1
(45) Date of Patent: Oct. 8, 2002

(54) OFFSET CONNECTING ROD FOR INTERNAL COMBUSTION ENGINES

(76) Inventor: Angelo V. Quaglino, Jr., Rte. 6, Box 207 VA, New Orleans, LA (US) 70129

( * ) Notice: Subject to any disclaimer, the term of this patent is extended or adjusted under 35 U.S.C. 154(b) by 0 days.

(21) Appl. No.: 09/735,782

(22) Filed: Dec. 13, 2000

(51) Int. Cl.[7] .......................... F02B 75/04; F02B 75/32
(52) U.S. Cl. ................. 123/197.3; 123/48 B; 123/78 E
(58) Field of Search ............................ 123/48 B, 78 E, 123/78 F, 197.4, 197.3

(56) References Cited

U.S. PATENT DOCUMENTS

| | | | |
|---|---|---|---|
| 1,335,947 A | * | 4/1920 | Welke ...................... 123/197.1 |
| 1,414,987 A | * | 5/1922 | Cohen et al. ............. 123/197.4 |
| 1,946,718 A | | 2/1934 | Stathas .......................... 123/53 |
| 3,087,342 A | | 4/1963 | Caddell ........................... 74/36 |
| 3,766,894 A | * | 10/1973 | Mize ........................... 123/52.5 |
| 4,465,042 A | * | 8/1984 | Bristol ...................... 123/197.4 |
| 4,505,239 A | | 3/1985 | Deland .......................... 123/197 |
| 4,672,921 A | | 6/1987 | Quaglino, Jr. ............. 123/41.38 |
| 4,945,866 A | | 8/1990 | Chabot, Jr. ..................... 123/54 |
| 5,186,127 A | | 2/1993 | Cuatico ........................... 123/54 |
| 5,544,627 A | * | 8/1996 | Terziev et al. ............. 123/197.3 |
| 5,615,642 A | | 4/1997 | Coughlin ....................... 123/54.4 |
| 5,816,201 A | | 10/1998 | Garvin ......................... 123/53.1 |
| 6,202,622 B1 | * | 3/2001 | Raquiza, Jr. .............. 123/197.4 |
| 6,289,857 B1 | * | 9/2001 | Boggs ........................ 123/78 E |

FOREIGN PATENT DOCUMENTS

| | | |
|---|---|---|
| DE | 2855667 A1 | 7/1980 |
| FR | 2593232 | 7/1987 |

* cited by examiner

Primary Examiner—Tony M. Argenbright
Assistant Examiner—Hai Huynh
(74) Attorney, Agent, or Firm—Garvey, Smith, Nehrbass & Doody, LLC

(57) ABSTRACT

An improved internal combustion engine which includes an engine block; a plurality of cylinders formed in the engine block; a piston moveable within each of the cylinders; a spark plug providing ignition to fuel within each of the cylinders for moving the cylinders along an engine cycle; a rod with a central longitudinal axis connecting each of the pistons at a first end of the rod to a crankshaft at the second end of each of the rod; the connection point between the second end of each of the rods to the crankshaft being offset from the longitudinal axis sufficiently to increase engine torque and horsepower, as each of the pistons travel within their respective cylinders, but not to affect the engine stroke.

10 Claims, 3 Drawing Sheets

OFFSET CONNECTING ROD FOR INTERNAL COMBUSTION ENGINES

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to internal combustion engines. More particularly, the present invention relates to an offset connecting piston rod which can be adapted to existing internal combustion engines in order to increase the engine torque and overall power.

2. General Background of the Invention

In a typical internal combustion engine, of the type found in most vehicles today, the engine is comprised in part of a plurality of pistons moveable within a plurality of cylinders formed in an engine block. Each of the pistons are connected to an piston rod on its first end, and to a crank shaft on its second end. When spark plugs in the engine block fire and ignite gasoline vapors, the pistons are driven downward, in turn turning the crank shaft which ultimately drives the entire vehicle. At present, in a typical engine, the connecting rods are straight rods, which connect on a centerline, at the first end to the piston, and at its second end secured to the crankshaft. The connecting points at each end of the connecting rod are along a centerline of the connecting rod, with the rod having the ability to swing in order to accommodate the movement of the crankshaft relative to the movement of the piston.

Because an engine works partially off of the torque created by the rotation of the crankshaft, it is important that the engine create as much torque with as little effort in order to be more efficient and use less fuel in the process. Therefore, there is a need in the industry for a combustion engine which is fuel efficient due to additional torque created in the relationship between the piston and the crankshaft.

Such a device would be more readily useful if the device could be adapted to existing internal combustion engines without having to redesign the engine block, but simply by replacing the current piston rods utilized in the industry.

Applicant is submitting herewith a prior art statement listing the prior art of which applicant is aware of at this time which may be helpful in the examination of the application.

BRIEF SUMMARY OF THE INVENTION

The apparatus of the present invention solves the problems in the art in a simple and straightforward manner. What is provided is an improved internal combustion engine which includes an engine block; a plurality of cylinders formed in the engine block; a piston moveable within each of the cylinders; a spark plug providing ignition to fuel within each of the cylinders for moving the cylinders along an engine cycle; a rod with a central longitudinal axis connecting each of the pistons at a first end of the rod to a crankshaft at the second end of each of the rod; the connection point between the second end of each of the rods to the crankshaft being offset from the longitudinal axis sufficiently to increase engine torque and horsepower, as each of the pistons travel within their respective cylinders, but not to affect the engine stroke. Therefore, it is a principal object of the present invention to provide a new and improved connecting rod which is adaptable to existing engines to increase the engine torque and overall engine efficiency;

It is a further object of the present invention to provide an improved connecting rod which is offset at its connection point of the crankshaft, so that more torque is created by the crankshaft when the engine fires; and It is a further object of the present invention to provide an improved connecting rod which allows to be retrofitted onto existing internal combustion engines which to an offset feature allows greater engine power.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
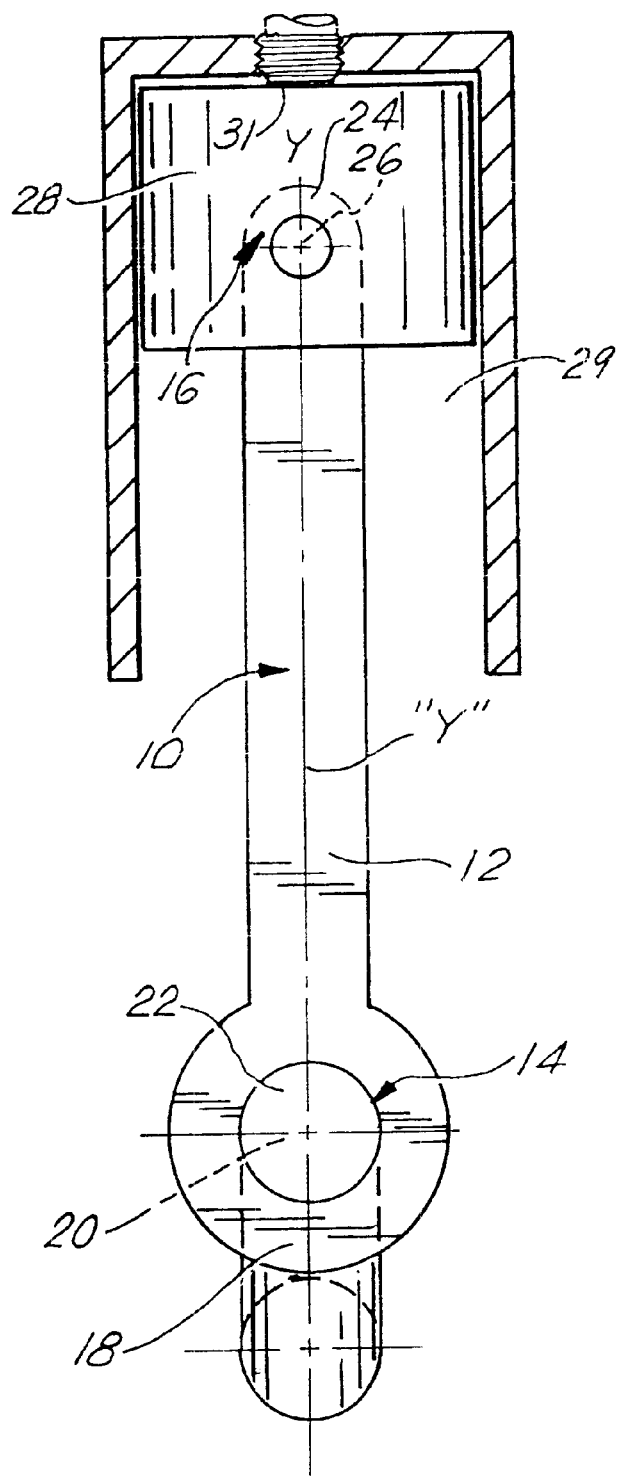
FIG. 1 is an overall view of a typical connecting rod as it relates to the piston and crankshaft of an engine.

While FIGS. 2–5 illustrate the preferred embodiment of the apparatus of the present invention, FIG. 1 illustrates the typical type of connecting rod currently used in internal combustion engines, and will be discussed first. As seen in FIG. 1, the type of connecting rod 10 currently used in the art comprises an elongated rod body 12, having a first end 14 and a second end 16. The first end 14 includes a circular terminating point 18, having a central bore 20, which allows a portion of a typical crankshaft 22 pass through, which is well known in the art. Likewise the second end 16 has a similar circular end terminating point 24 which includes a circular bore 26 which engages to the lower end of a piston 28, which would be contained within a piston cylinder 29. As is well known in the art, the movement of the pistons 28 is caused by the firing of the spark plugs 31, mounted above the cylinder wall, so that as fuel enters the cylinder chamber, the plugs 31 fire, and the pistons 28 move up and down within their respective cylinders. This movement imparts rotation to the crankshaft 22, which in turn powers the vehicle. As is also well known, the connection between the piston 28 and the second end 16 of the connecting rod 10, and the crankshaft 22 and the first end 14 of the connecting rod 10, allows movement relative to the piston 28, rod 10 and crankshaft 22, as the engine runs through its power cycle. As seen further in FIG. 1, in conventional connecting rods, the two central bores 20 on the first end of the rod, and bore 26 on the second end of the rod are formed along a central longitudinal axis "Y" of the rod 10, which provides uniform alignment of the two bores 20, 26.

Turning now to the improved connecting rod, reference is made to FIGS. 2 through 5. The improved connecting rod is referred to by the numeral 30. As with the existing rod discussed in regard to FIG. 1, the improved connecting rod 30 likewise has an elongated body portion 32, having a first end 34 with a bore 36 formed to engage onto the piston 28 within the cylinder 29. As with the connecting rod 10, the bore 36 is positioned along the central longitudinal axis Y of the rod body 32. However, the second end 38 of the rod body 32 has been significantly modified. Although the second end 40 of the rod body includes a bore 42 for accommodating the passage of the crankshaft 22, the bore has been significantly offset from the central axis "Y" of the body 32. As illustrated, the rod body 32 includes a first wall 44 and a second wall 46. The second wall 46 extends downward to a point 47, which if extended, would dissect the bore 42 formed in the lower end of the rod body 32, along phantom line 50. Therefore, in effect, the circular lower end 38 of the rod body 32 has been significantly offset from the longitudinal axis "Y." Therefore, the rod body 32 is not simply formed along a single axis Y, but the bore 42 defines an offset bore 42, through which the crankshaft 22 travels. In creating this offset, it serves as a means to increase the engine torque and in turn increase the horsepower of the engine, as will be discussed further.

Figure 3:
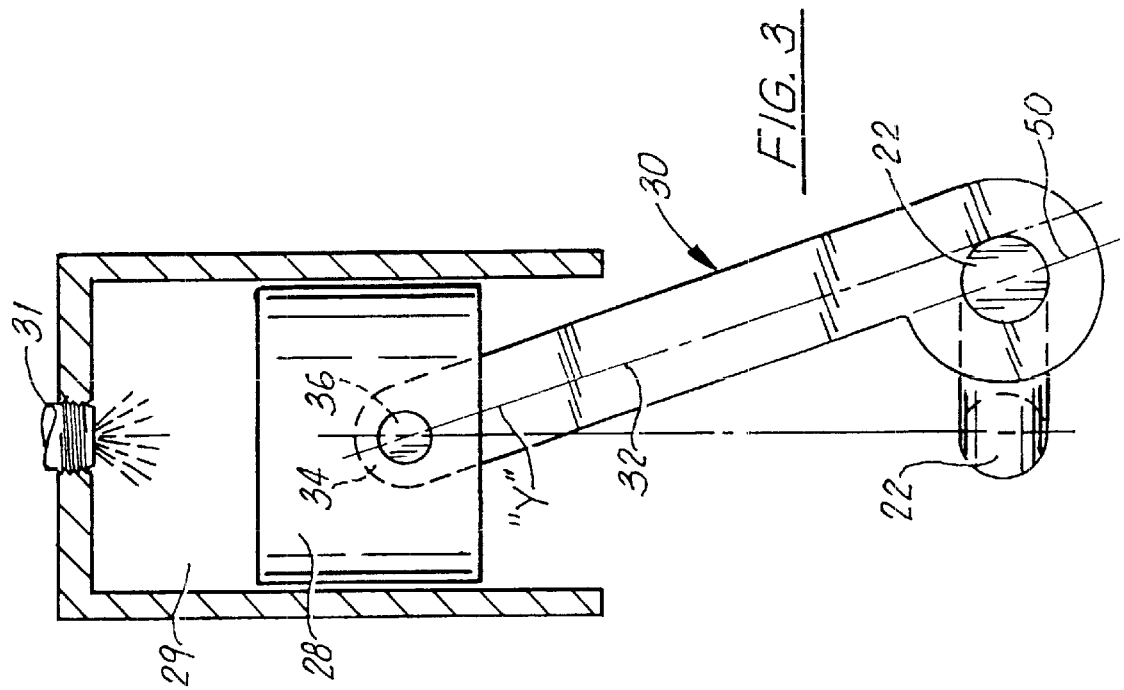
FIG. 3 an overall view as seen in FIG. 2, with the connecting rod in a second position.
Figure 2:
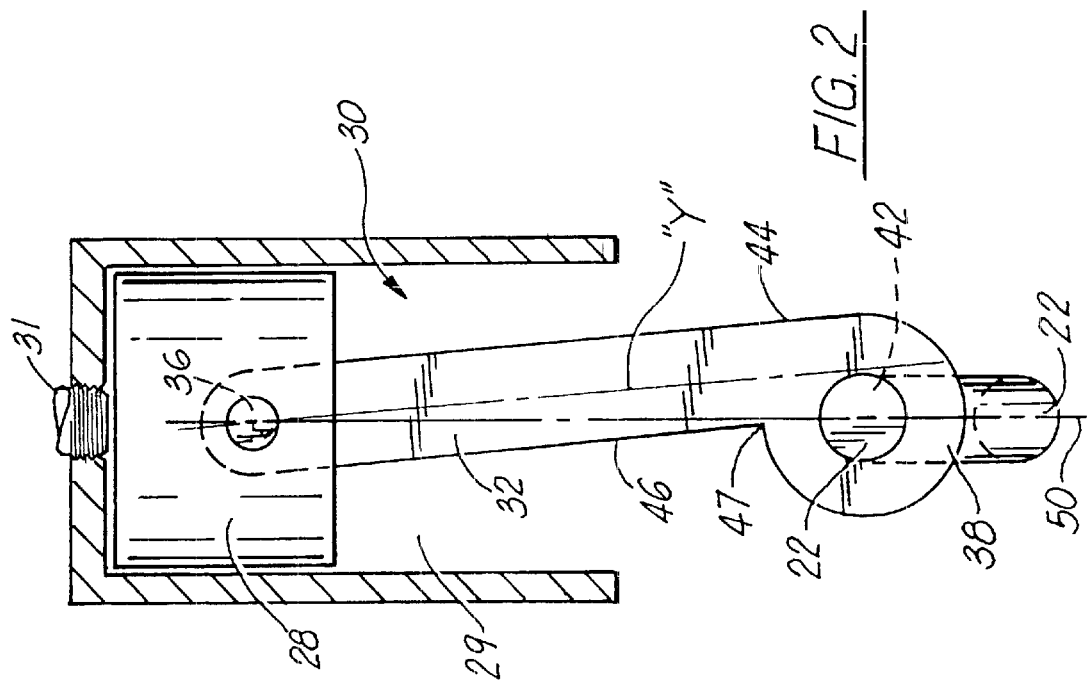
FIG. 2 is an overall view of the improved offset connecting rod positioned between a piston and a crankshaft with the rode in a first position.
Figures 4, 5:
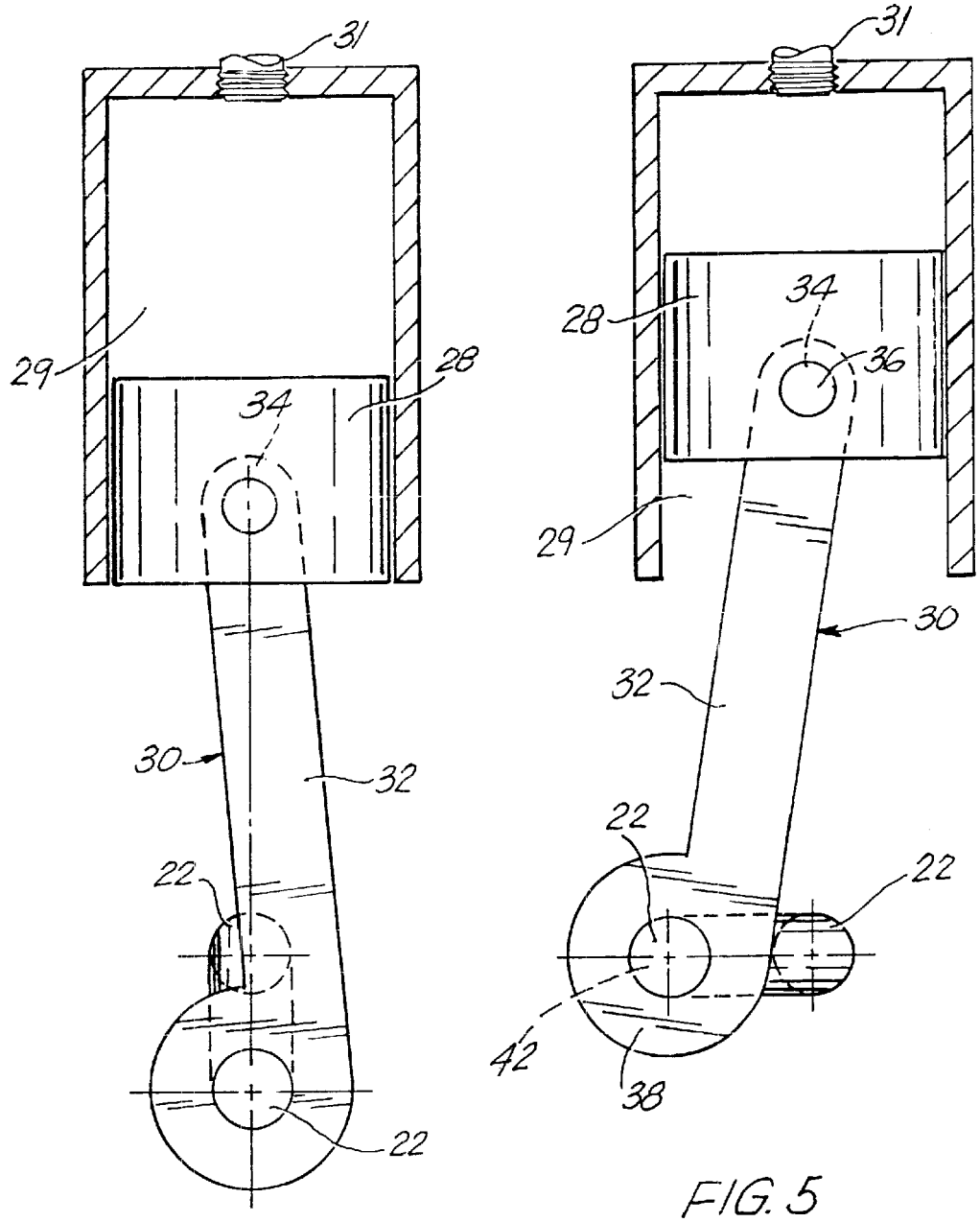
FIG. 4 an overall view as seen in FIG. 2, with the connecting rod in a third position.
FIG. 5 an overall view as seen in FIG. 2, with the connecting rod in a fourth position.

Turning now to FIG. 3, the spark plug 31 has fired, and the piston 28 is forced downward within cylinder 29, as illustrated. When this occurs, the portion of the crankshaft 22 traveling through bore 42 has moved some 90 degrees along its path, i.e. it has traveled from its 12 o'clock position as seen in FIG. 2, to a 3 o'clock position as seen in FIG. 3. Turning to FIG. 4, the piston 28 continues in its downward path, so that the crankshaft has rotated 180 degrees from FIG. 2, or to the 6 o'clock position. Continuing on, as other pistons are firing, piston 28 will travel along the path to have the crankshaft rotated 270 degrees, as seen in FIG. 5, from its position in FIG. 2. Finally, the crankshaft 22 has rotated 360 degrees, and piston 28 has returned to the upmost position which was described in FIG. 2. Because of the offset feature in the connection between the lower end 38 of the rod 32, as the piston 28 is traveling, the connecting rod is providing increased torque to the crankshaft 22, which results in increased horsepower to the engine, through greater efficiency.

Because of the design of the offset rod 30, the rod can be retrofitted into most if not all existing internal combustion engines without having to undertake any redesign of the engine block or the crankshaft 22. The improved rod 32 provides greater leverage over the journal on the crankshaft 22 without changing the stroke of the engine. For example, the small block of a Ford vehicle of 302 cu. in. has a 3.00 inch stroke, while a 351 cu. in. Ford engine has a 3.5 inch stroke. Or, the small block Chevrolet vehicle has a 265 or 283 cu. in., and has a 3.00 inch stroke, while a 350 cu. in. engine has a 3.48 inch stroke, with the same small block. The improved connecting rod 30 would increase the horsepower and torque of such engines by increasing the leverage on the crank shaft. The increased leverage on the crank shaft would have the same effect as increasing the engine stroke, but without having to change the block, and resulting in greater engine horsepower. The existing block would have the necessary clearance without any other modifications.

The foregoing embodiments are presented by way of example only; the scope of the present invention is to be limited only by the following claims.

What is claimed is:

1. An improved internal combustion engine, comprising:
   a. a conventional engine block;
   b. at least one cylinder formed in the conventional engine block;
   c. a piston moveable within the cylinder;
   d. a rod with a central longitudinal axis connecting the piston at a first end of the rod to a crankshaft at the second end of the rod;
   e. the connection point between the second end of the rod to the crankshaft being offset from the longitudinal axis sufficiently to increase engine torque and horsepower, as the piston travels within the cylinder.

2. The engine in claim 1, wherein there may be provided a plurality of cylinders formed in the engine block each housing a piston to drive the crankshaft.

3. The engine in claim 1, wherein the offset connection between the lower end of the rod and the crankshaft allows for greater horsepower to the engine with less engine effort.

4. The improved engine in claim 1, wherein the single modification to the engine is the use of the offset connecting rod.

5. An improved internal combustion engine of the type comprising a conventional engine block; a plurality of cylinders formed in the engine block; a piston moveable within each of the cylinders; a rod with a central longitudinal axis connecting each of the pistons at a first end of each of the rods to a crankshaft at a second end of each of the rods, the improvement comprising: a connection point between the second end of the rod to the crankshaft being offset from the longitudinal axis sufficiently to increase the torque provided to the crankshaft by each of the pistons in order to increase the horsepower of the engine.

6. The engine in claim 5, wherein the improvement may be adapted to all existing internal combustion engines.

7. The engine in claim 5, further comprising a means for powering the movement of the pistons within their respective cylinders.

8. The engine in claim 7, wherein the means further comprises a spark plug igniting fuel within the cylinder upon a signal to the spark plug.

9. The engine in claim 5, wherein the offset connection between the rod and the crankshaft does not increase the engine stroke, but increases the torque and ultimately the engine horsepower.

10. An improved internal combustion engine, comprising:
    a. a conventional engine block;
    b. a plurality of cylinders formed in the engine block;
    c. a piston moveable within each of the cylinders;
    d. a spark plug providing ignition to fuel within each of the cylinders for moving the cylinders along an engine cycle;
    d. a rod with a central longitudinal axis connecting each of the pistons at a first end of the rod to a crankshaft at the second end of each of the rod;
    e. the connection point between the second end of each of the rods to the crankshaft being offset from the longitudinal axis sufficiently to increase engine torque and horsepower, as each of the pistons travel within their respective cylinders, but not to affect the engine stroke.

* * * * *